(12) United States Patent
Nishino et al.

(10) Patent No.: US 10,913,507 B2
(45) Date of Patent: Feb. 9, 2021

(54) CONTROLLER, HUMAN-POWERED VEHICLE SYSTEM, AND CONTROL METHOD

(71) Applicant: Shimano Inc., Osaka (JP)

(72) Inventors: Takafumi Nishino, Osaka (JP);
Toshihiko Takahashi, Osaka (JP);
Hitoshi Takayama, Osaka (JP);
Masahiro Nakakura, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/161,645

(22) Filed: Oct. 16, 2018

(65) Prior Publication Data

US 2019/0118892 A1 Apr. 25, 2019

(30) Foreign Application Priority Data

Oct. 24, 2017 (JP) ................... 2017-205537
Oct. 24, 2017 (JP) ................... 2017-205538
Nov. 21, 2017 (JP) ................... 2017-223848

(51) Int. Cl.
*B62J 3/00* (2020.01)
*B62J 99/00* (2020.01)
*B62H 5/14* (2006.01)
*B62M 6/50* (2010.01)
*G01J 1/02* (2006.01)
*B62M 6/55* (2010.01)
(Continued)

(52) U.S. Cl.
CPC ............... *B62J 99/00* (2013.01); *B62H 5/14* (2013.01); *B62K 3/00* (2013.01); *B62M 6/50* (2013.01); *B62M 6/55* (2013.01); *G01J 1/0228* (2013.01); *G01J 1/44* (2013.01); *B62J 45/00* (2020.02); *B62J 45/40* (2020.02); *G01J 2001/0257* (2013.01)

(58) Field of Classification Search
CPC .................. B62J 99/00; B62J 2099/002; B62J 2099/004; B62K 3/00; B62K 2207/00; G01J 1/44; G01J 2001/0257
See application file for complete search history.

(56) References Cited

U.S. PATENT DOCUMENTS

| 7,377,180 B2 | 5/2008 | Cunningham |
| 9,037,199 B1 * | 5/2015 | Stogaitis ............... A61B 5/1116 455/574 |

(Continued)

FOREIGN PATENT DOCUMENTS

| CN | 103206915 A | 7/2013 |
| CN | 204489032 U | 7/2015 |

(Continued)

*Primary Examiner* — Phung Nguyen
(74) *Attorney, Agent, or Firm* — Global IP Counselors, LLP

(57) ABSTRACT

A human-powered vehicle system and a control method are provided that reduce power consumption of a detection device. The human-powered vehicle system includes an electronic controller having at least one processor configured to control a detection device provided at a human-powered vehicle to detect an electromagnetic wave having a frequency that is greater than or equal to 30 GHz and excluding visible light. The at least one processor is configured to control the detection device in at least one of a first mode and a second mode that consumes less power than the first mode.

18 Claims, 6 Drawing Sheets

(51) Int. Cl.
 B62K 3/00 (2006.01)
 G01J 1/44 (2006.01)
 B62J 45/00 (2020.01)
 B62J 45/40 (2020.01)

(56) References Cited

U.S. PATENT DOCUMENTS

| | | | |
|---|---|---|---|
| 9,153,133 B1 | 10/2015 | Lunsford | |
| 10,444,370 B2* | 10/2019 | Zhang | G01V 8/10 |
| 2016/0154099 A1* | 6/2016 | Saito | G01S 7/412 |
| | | | 342/28 |
| 2016/0339978 A1* | 11/2016 | Braucht | B62J 3/00 |
| 2016/0339989 A1* | 11/2016 | Walthert | F16F 9/535 |
| 2016/0339990 A1* | 11/2016 | Walthert | B62K 25/04 |

FOREIGN PATENT DOCUMENTS

| | | |
|---|---|---|
| CN | 204750404 U | 11/2015 |
| CN | 106064663 A | 11/2016 |
| DE | 10 2013 016 777 A1 | 4/2014 |
| DE | 10 2018 209 105 A1 | 1/2019 |
| JP | 2007-223399 A | 9/2007 |
| JP | 2013-145117 A | 7/2013 |
| JP | 2016-97877 A | 5/2016 |
| JP | 2017-522681 A | 8/2017 |
| JP | 2017-170921 A | 9/2017 |

* cited by examiner

CONTROLLER, HUMAN-POWERED VEHICLE SYSTEM, AND CONTROL METHOD

CROSS-REFERENCE TO RELATED APPLICATIONS

This application claims priority to Japanese Patent Application No. 2017-223848, filed on Nov. 21, 2017. The entire disclosure of Japanese Patent Application No. 2017-223848 is hereby incorporated herein by reference.

BACKGROUND

Field of the Invention

The present invention generally relates to an electronic controller, a human-powered vehicle system including a controller, and a control method.

Background Information

Japanese Laid-Open Patent Publication No.2016-97877 (Patent document 1) discloses one example of a controller mounted on a human-powered vehicle. The controller controls an assist device based on the reflection level of a beam that is emitted by a detection device toward the ground and is reflected from the ground.

SUMMARY

In a human-powered vehicle, it is preferred that power consumption of a detection device provided at a human-powered vehicle be reduced.

A first aspect of the present disclosure is an electronic controller for a detection device provided at a human-powered vehicle to detect an electromagnetic wave having a frequency that is greater than or equal to 30 GHz and excluding visible light. The electronic controller comprises at least one processor that is configured to control the detection device in at least one of a first mode and a second mode that consumes less power than the first mode. With the electronic controller according to the first aspect, the first mode and the second mode are switched as necessary. Thus, power consumption of the detection device is reduced.

In accordance with a second aspect of the present disclosure, the electronic controller according to the first aspect is configured so that the at least one processor is configured to control the detection device in at least one of the first mode and the second mode based on information related to the human-powered vehicle. With the electronic controller according to the second aspect, the detection device is controlled based on the information related to the human-powered vehicle. Thus, the control is executed in accordance with an intention of the driver of the human-powered vehicle.

In accordance with a third aspect of the present disclosure, the electronic controller according to the second aspect is configured so that the information related to the human-powered vehicle includes at least one of information related to vibration of the human-powered vehicle, information related to a total weight of the human-powered vehicle, information related to a rotary body of the human-powered vehicle, information related to an operating device of the human-powered vehicle, and information related to a lock device of the human-powered vehicle. With the electronic controller according to the third aspect, the detection device can be controlled based on various kinds of information.

In accordance with a fourth aspect of the present disclosure, the electronic controller according to the second or third aspect is configured so that upon the at least one processor determining the information related to the human-powered vehicle is not obtained for a first predetermined time in the first mode, the at least one processor is configured to control the detection device in the second mode. With the electronic controller according to the fourth aspect, the switching from the first mode to the second mode is easily performed.

In accordance with a fifth aspect of the present disclosure, the electronic controller according to any one of the first to fourth aspects is configured so that the at least one processor is configured to control the detection device so that the detection device intermittently operates in the second mode. With the electronic controller according to the fifth aspect, the power consumption of the detection device is further reduced in the second mode.

In accordance with a sixth aspect of the present disclosure, the electronic controller according to any one of the first to fifth aspects is configured so that the at least one processor is configured to stop supply of electric power to the detection device in the second mode. With the electronic controller according to the sixth aspect, the power consumption of the detection device is further reduced in the second mode.

In accordance with a seventh aspect of the present disclosure, the electronic controller according to any one of the first to sixth aspects is configured so that the at least one processor is configured to control the detection device in any one of the first mode, the second mode, and a third mode that consumes less power than the first mode and the second mode. With the electronic controller according to the seventh aspect, the detection device can be variously controlled.

In accordance with an eighth aspect of the present disclosure, the electronic controller according to the seventh aspect is configured so that upon the at least one processor determining the information related to the human-powered vehicle is not obtained for a second predetermined time in the second mode, the at least one processor is configured to control the detection device in the third mode. With the electronic controller according to the eighth aspect, the switching from the second mode to the third mode is easily performed.

In accordance with a ninth aspect of the present disclosure, the electronic controller according to the seventh or eighth aspect is configured so that the at least one processor is configured to stop supply of electric power to the detection device in the third mode. With the electronic controller according to the ninth aspect, the power consumption of the detection device is further reduced in the third mode.

In accordance with a tenth aspect of the present disclosure, the electronic controller according to any one of the first to ninth aspects is configured so that the detection device outputs an electromagnetic wave having a frequency that is greater than or equal to 30 GHz and excluding visible light. The detection device detects the electromagnetic wave that is reflected. With the electronic controller according to the tenth aspect, the detection device is appropriately controlled.

In accordance with an eleventh aspect of the present disclosure, the electronic controller according to any one of the first to tenth aspects is configured so that the detection device detects at least one of an ultraviolet ray, an infrared ray, a submillimeter wave, and a millimeter wave. With the controller according to the eleventh aspect, the detection device is appropriately controlled.

In accordance with a twelfth aspect of the present disclosure, the electronic controller according to any one of the first to eleventh aspects is configured so that the detection device outputs an electromagnetic wave including at least one of an ultraviolet ray, an infrared ray, a submillimeter wave, and a millimeter wave. The detection device detects the electromagnetic wave that is reflected. With the electronic controller according to the twelfth aspect, the detection device is appropriately controlled.

A thirteenth aspect of the present disclosure is a human-powered vehicle system that includes the electronic controller according to any one of the first to twelfth aspects and a detection device that detects an electromagnetic wave having a frequency that is greater than or equal to 30 GHz and excluding visible light. With the human-powered vehicle according to the thirteenth aspect, the first mode and the second mode are switched as necessary. Thus, power consumption of the detection device is reduced.

In accordance with a fourteenth aspect of the present disclosure, the human-powered vehicle system according to the thirteenth aspect further includes a power supply that supplies electric power to the detection device. With the human-powered vehicle according to the fourteenth aspect, electric power is appropriately supplied to the detection device.

In accordance with a fifteenth aspect of the present disclosure, the human-powered vehicle system according to the fourteenth aspect is configured so that the power supply includes at least one of a power generator and a power storage portion. With the human-powered vehicle according to the fifteenth aspect, electric power is appropriately supplied to the detection device In accordance with a sixteenth aspect of the present disclosure, the human-powered vehicle system according to the fourteenth or fifteenth aspect is configured so that the detection device includes a housing, and the power supply is arranged in the housing. With the human-powered vehicle according to the sixteenth aspect, the power supply is protected.

In accordance with a seventeenth aspect of the present disclosure, the human-powered vehicle system according to the fourteenth or fifteenth aspect is configured so that the power supply is arranged separately from the detection device. With the human-powered vehicle according to the seventeenth aspect, the degree of freedom for arranging the detection device and the power supply is increased.

In accordance with an eighteenth aspect of the present disclosure, the human-powered vehicle system according to any one of the fourteenth to seventeenth aspects is configured so that the power supply is configured to supply electric power to a component of the human-powered vehicle. With the human-powered vehicle according to the eighteenth aspect, the convenience is increased.

A nineteenth aspect of the present disclosure is a control method is provided comprising controlling a detection device provided at a human-powered vehicle to detect an electromagnetic wave having a frequency that is greater than or equal to 30 GHz and excluding visible light in at least one of a first mode and a second mode that consumes less power than the first mode. With the control method according to the nineteenth aspect, the first mode and the second mode are switched as necessary. Thus, power consumption of the detection device is reduced.

The controller, the human-powered vehicle, and the control method according to the present disclosure reduce power consumption of a detection device.

BRIEF DESCRIPTION OF THE DRAWINGS

Referring now to the attached drawings which form a part of this original disclosure.

DETAILED DESCRIPTION OF EMBODIMENTS

Figure 1:
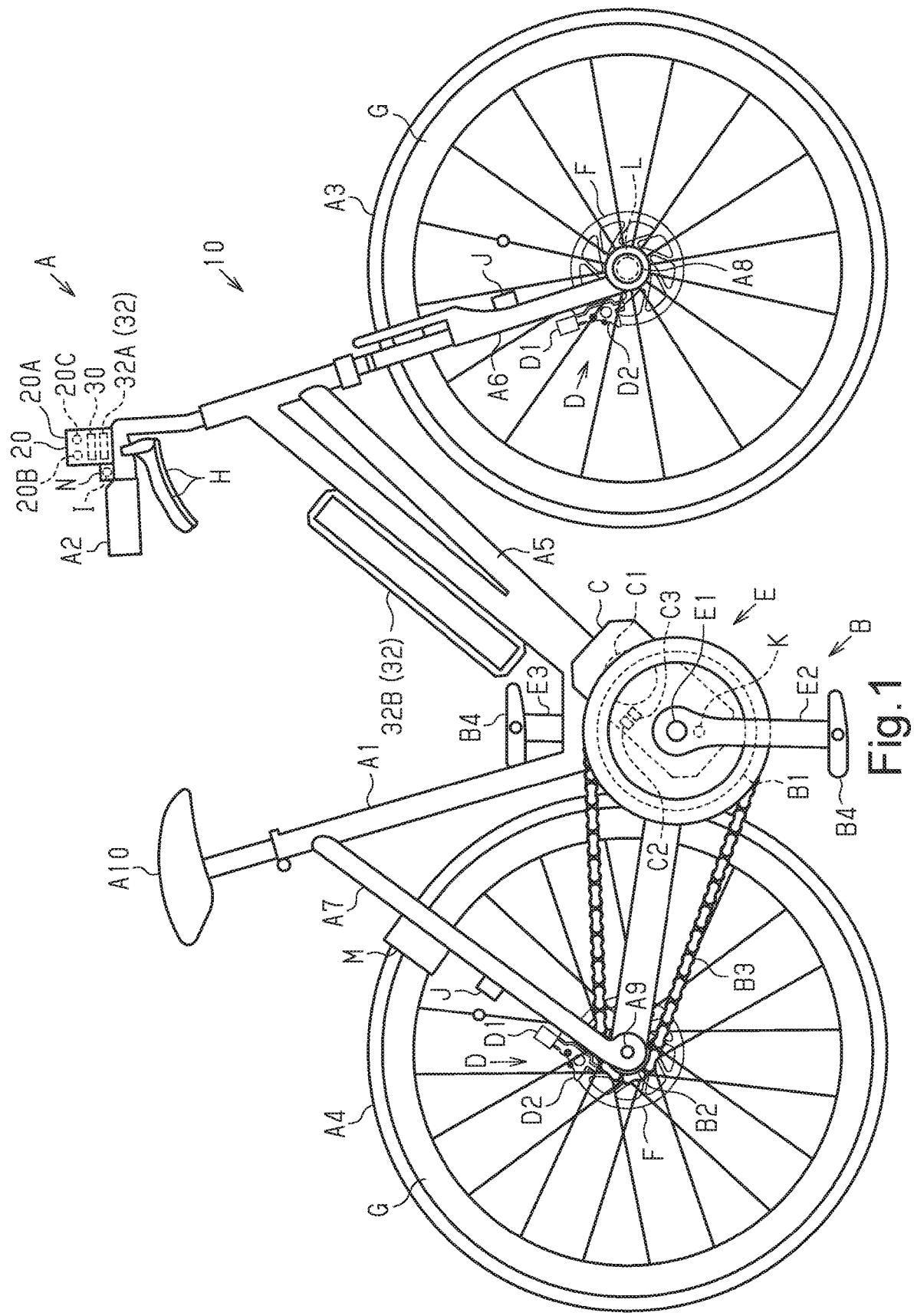
FIG. 1 is a side elevational view of a human-powered vehicle equipped with a human-powered vehicle system in accordance with one embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Embodiment

A human-powered vehicle A that includes a human-powered vehicle system 10 will now be described with reference to FIG. 1. The human-powered vehicle A refers to a vehicle that at least partially uses human power as a driving force for propulsion and includes a vehicle that assists human power with an electric motor. Human-powered vehicles do not include vehicles that use only driving forces other than human power. In particular, human-powered vehicles do not include vehicles that solely use internal combustion engines for driving force. A typical human-powered vehicle is a small and light vehicle that does not require a license for driving on a public road. The illustrated human-powered vehicle A is a bicycle (e-bike) including an assist device C that uses electric energy to assist propulsion of the human-powered vehicle A. More specifically, the illustrated human-powered vehicle A is a city bicycle. The configuration of the human-powered vehicle A can be changed in any manner. The human-powered vehicle A can be configured without the assist device C. In other words, the human-powered vehicle A can be a typical bicycle that is driven by only human driving force. The type of the human-powered vehicle A can be a road bike, a mountain bike, or a cross bike. The human-powered vehicle A includes a main body A1, a handlebar A2, a front wheel A3, a rear wheel A4, a drive mechanism B, the assist device C, a brake device D, and the human-powered vehicle system 10. The main body A1 includes a frame A5.

The drive mechanism B transmits a human driving force to the rear wheel A4. The drive mechanism B is a chain-drive type that includes a front sprocket B1, a rear sprocket B2, a chain B3, a crank mechanism E and a pair of pedals B4. The drive mechanism B can be, for example, a belt-drive type or a shaft-drive type.

The crank mechanism E includes a crankshaft E1, a right crank E2 and a left crank E3. The crankshaft E1 is rotatably supported by a bottom bracket (not shown) provided on the frame A5. The right crank E2 and the left crank E3 are coupled to the crankshaft E1. One of the pedals B4 is rotatably supported by the right crank E2. The other one of the pedals B4 is rotatably supported by the left crank E3.

The front sprocket B1 is coupled to the crankshaft E1. The rotation axis of the crankshaft E1 is aligned with the rotation axis of the front sprocket B1. Any structure for coupling the front sprocket B1 to the crankshaft E1 can be selected. A one-way clutch (not shown) is provided between the crankshaft E1 and the front sprocket B1. The one-way clutch transmits rotation of the crankshaft E1 to the front sprocket B1 in a case where the crankshaft E1 is rotating forward at a higher rotational speed than the front sprocket B1. The one-way clutch can be omitted.

The rear sprocket B2 is supported by a hub of the rear wheel A4. The chain B3 runs around the front sprocket B1 and the rear sprocket B2. In a case where human driving force is applied to the pair of pedals B4 to rotate the crankshaft E1 and the front sprocket B1 forward, the human driving force is transmitted via the chain B3 and the rear sprocket B2 and rotates the rear wheel A4 forward.

The assist device C includes an assist motor C1, a drive circuit C2, a speed reducer C3, and a one-way clutch. The assist device C assists propulsion of the human-powered vehicle A by transmitting torque to the front sprocket B1. The assist motor C1 is operated by electric power supplied from a power supply 32, which will be described later.

The brake device D is driven by electric power to brake a rotary body F of the human-powered vehicle A. The rotary body F is, for example, a disc brake rotor provided on each of the front wheel A3 and the rear wheel A4 of the human-powered vehicle A. In this embodiment, two brake devices D are provided corresponding to the front wheel A3 and the rear wheel A4, respectively. In this embodiment, the brake device D is a disc brake device that changes rotational speed of the disc brake rotor. The brake device D includes an electric motor D1 and a braking portion D2. The electric motor D1 is operated by electric power supplied from the power supply 32, which will be described later. In one example, the braking portion D2 includes a hydraulic mechanism and a braking member operated by the hydraulic mechanism. The braking portion D2 applies the brake by clamping the rotary body F of the human-powered vehicle A, which is the disc brake rotor, with a pair of braking members. The brake device D can be a rim brake device that brakes a rim G of each of the front wheel A3 and the rear wheel A4 of the human-powered vehicle A.

Figure 2:
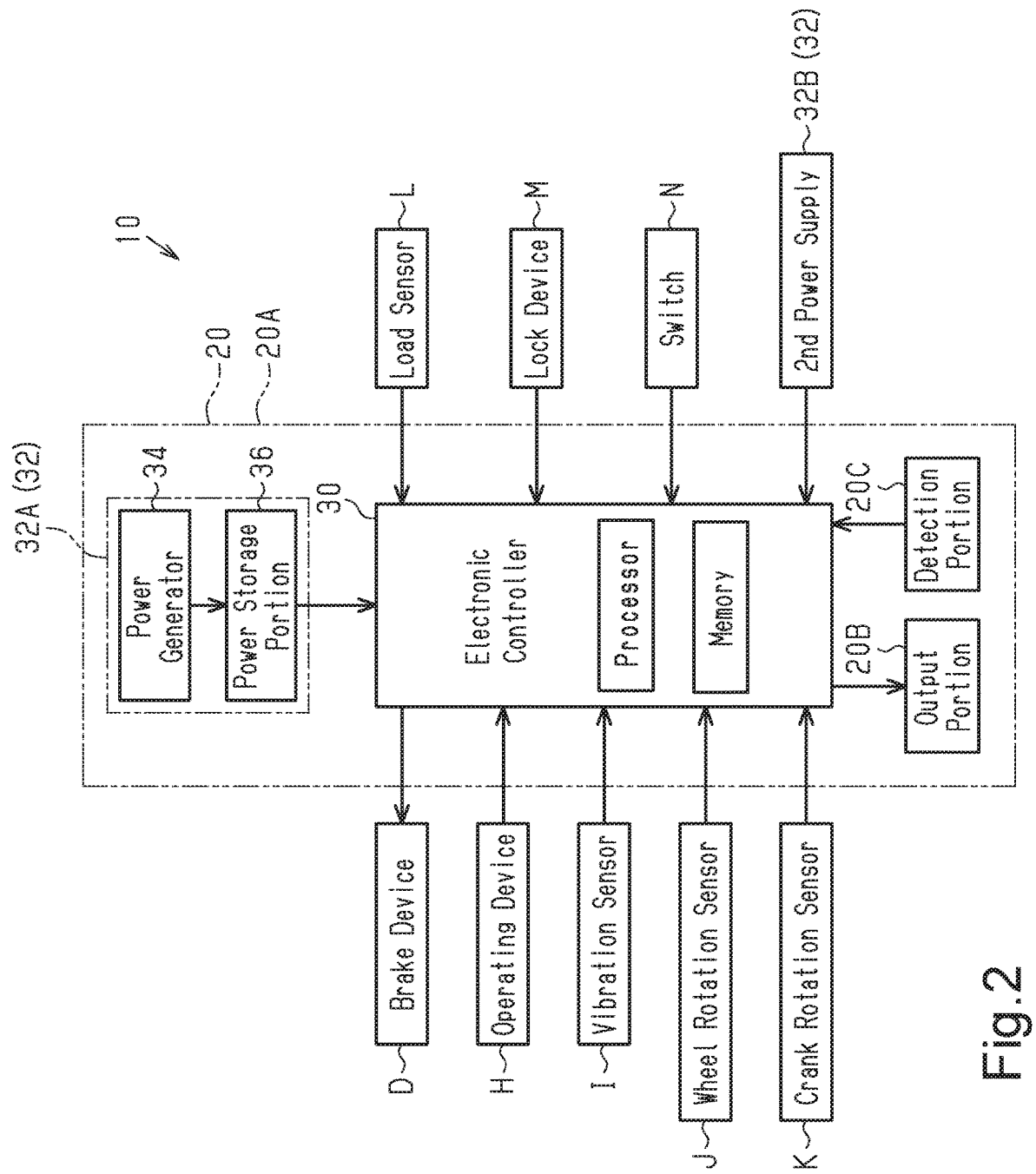
FIG. 2 is a block diagram of the human-powered vehicle shown in FIG. 1.

As shown in FIG. 2, the human-powered vehicle A further includes an operating device H, a vibration sensor I, a wheel rotation sensor J, a crank rotation sensor K, a load sensor L, a lock device M, and a switch N.

The operating device H is manually operated to drive the brake device D of the human-powered vehicle system 10. The operating device H includes, for example, a lever. The operating device H is connected to communicate with the human-powered vehicle system 10 so that a signal is transmitted to the brake device D in accordance with an operation of the lever. The operating device H is connected to communicate with the human-powered vehicle system 10 by a wire allowing power line communication (PLC) or a communication line. Alternatively, the operating device H can be connected to communicate with the human-powered vehicle system 10 by a wireless communication device that allows wireless communication. In a case where the operating device H is operated, a signal for braking at least one of the front wheel A3 and the rear wheel A4 is transmitted via the wireless communication device to an electronic controller 30 of the human-powered vehicle system 10, and the brake device D is operated in accordance with the signal. The term "electronic controller" as used herein refers to hardware that executes a software program. The electronic controller 14 will hereafter be referred to simply as the controller 14.

The vibration sensor I detects vibration that occurs in the human-powered vehicle A. One example of a vibration detected by the vibration sensor I is a vibration level (dB) that indicates a magnitude of vibration. The vibration sensor I is provided, for example, on the frame A5 of the human-powered vehicle A. The vibration sensor I is, for example, an acceleration sensor, a speed sensor, or a displacement sensor. The vibration sensor I is connected to perform wired or wireless communication with the controller 30. The controller 30 calculates the level or magnitude of the vibration of the human-powered vehicle A based on an output of the vibration sensor I. Preferably, the controller 30 calculates the level of at least one of a vertical vibration of the human-powered vehicle A and a lateral (sideward) vibration of the human powered vehicle A.

The wheel rotation sensor J detects rotational speed of at least one of the front wheel A3 and the rear wheel A4 of the human-powered vehicle A. The wheel rotation sensor J is connected to perform wired or wireless communication with the controller 30. In this embodiment, the wheel rotation sensor J is attached to each of a front fork A6 (refer to FIG. 1) of the frame A5 and a seatstay A7 (refer to FIG. 1) of the frame A5. The wheel rotation sensor J is connected to perform wired or wireless communication with the controller 30. The wheel rotation sensor J transmits a signal corresponding to a change in the relative position of a magnet attached to the front wheel A3 and the wheel rotation sensor J to the controller 30 of the human-powered vehicle system 10. The controller 30 calculates the vehicle speed of the human-powered vehicle A based on the signal. This allows for a detection of whether or not the rotary body F is rotated. Additionally, the wheel rotation sensor J transmits a signal corresponding to a change in the relative position of a magnet attached to the rear wheel A4 and the wheel rotation sensor J to the controller 30 of the human-powered vehicle system 10. Alternatively, the wheel rotation sensor J can be provided at the brake device D to detect rotation of the rotor, which is the rotary body F.

The crank rotation sensor K detects the rotational speed and the rotational angle of the crankshaft E1 (refer to FIG. 1). The crank rotation sensor K is attached to the frame A5 of the human-powered vehicle A. The crank rotation sensor K is configured to include a magnetic sensor that outputs a signal corresponding to the strength of a magnetic field. The crank rotation sensor K is connected to perform wired or wireless communication with the controller 30. The crank rotation sensor K transmits a signal corresponding to the rotational speed and the rotational angle of the crankshaft E1 to the controller 30.

The load sensor L detects a total weight of the human-powered vehicle A. The total weight of the human-powered vehicle A includes the weight of the human-powered vehicle A and the weight of the rider of the human-powered vehicle A. The load sensor L detects a load of the front wheel A3 or the rear wheel A4. The load sensor L is provided, for example, on a hub axle A8 of the front wheel A3 or a hub axle A9 of the rear wheel A4. The load sensor L is, for example, a load cell. The load sensor L is connected to perform wired or wireless communication with the controller 30. The load sensor L transmits a signal corresponding to pressure applied to the load sensor L from the front wheel A3 or the rear wheel A4 to the controller 30. The load sensor L can be used to detect loads of the handlebar A2, the pedals B4, and a saddle A10 of the human-powered vehicle A. In this case, the sum of the predetermined weight of the human-powered vehicle A and the load of the handlebar A2, the load of the pedals B4, and the load of the saddle A10, which are detected by the load sensor L, can be defined as the total weight of the human-powered vehicle A.

The locking device M locks and unlocks the rear wheel A4. In other words, the lock device M is configured to be switched to a lock state, which restricts rotation of the rear wheel A4, and an unlock state, which allows rotation of the rear wheel A4. The lock device M is connected to perform wired or wireless communication with the controller 30. The lock device M is coupled to, for example, the seatstay A7 of the frame A5. The lock device M transmits a signal corresponding to the present state, which is the lock state or the unlock state, to the controller 30.

The switch N includes a plurality of switches (e.g., buttons) that turn the assist device C and the human-powered vehicle system 10 on and off. The switch N is connected to perform wired or wireless communication with the assist device C and the human-powered vehicle system 10. The switch N can be connected to communicate with the assist device C and the human-powered vehicle system 10 by a wireless communication device that allows wireless communication. The switch N is provided, for example, on the handlebar A2 (refer to FIG. 1).

The human-powered vehicle system 10 includes a detection device 20 and the controller 30. Preferably, the human-powered vehicle system 10 includes the power supply 32. The detection device 20 is provided at the human-powered vehicle A to detect electromagnetic waves having a frequency that is greater than or equal to 30 GHz while excluding visible light. The range of frequencies of visible light is based on the specification of international organization for standardization (ISO). For example, the range of frequencies of visible light approximately 400 THz to 790 THz. The detection device 20 outputs an electromagnetic wave having a frequency that is greater than or equal to 30 GHz and excluding a frequency in the visible light range. The detection device 20 detects a reflected electromagnetic wave. Thus, the ambient environment of the human-powered vehicle A is detected with high accuracy. In the description hereinafter, an electromagnetic wave having a frequency that is greater than or equal to 30 GHz and excluding a frequency in the visible light range is simply referred to as an electromagnetic wave. The detection device 20 detects at least one of an ultraviolet ray, an infrared ray (e.g., 300 GHz to 400 THz), a submillimeter wave (e.g., above 300 GHz), and a millimeter wave (e.g., 30 GHz to 300 GHz). The detection device 20 outputs an electromagnetic wave including at least one of an ultraviolet ray, an infrared ray, a submillimeter wave, and a millimeter wave and detects a reflected electromagnetic wave.

The detection device 20 includes a housing 20A. The detection device 20 further includes an output portion 20B and a detection portion 20C. The housing 20A is provided, for example, on the handlebar A2 (refer to FIG. 1). The output portion 20B and the detection portion 20C are located in the housing 20A. The output portion 20B outputs electromagnetic waves around the human-powered vehicle A. The detection portion 20C receives reflected ones of the electromagnetic waves output by the output portion 20B.

The power supply 32 includes a first power supply 32A and a second power supply 32B. The installation location of the power supply 32 is one of the inside of the housing 20A of the detection device 20 and the outside of the detection device 20. In a case where the power supply 32 is arranged in the housing 20A of the detection device 20, the power supply 32 is protected. In a case where the power supply 32 is located outside the detection device 20, the degree of freedom for arranging the detection device 20 and the power supply 32 increases. The first power supply 32A supplies electric power to the detection device 20. Thus, electric power is appropriately supplied to the detection device 20. The first power supply 32A is arranged in the housing 20A. Thus, the first power supply 32A is protected. The first power supply 32A includes at least one of a power generator 34 and a power storage portion 36. The first power supply 32A includes, for example, at least one of a solar battery, a piezoelectric element, and an electromagnetic induction generator as the power generator 34. The first power supply 32A includes at least one of a lead-acid battery, a nickel-metal hydride battery, and a lithium-ion battery as the power storage portion 36. The first power supply 32A can be omitted. In this case, the second power supply 32B supplies electric power to the detection device 20.

The second power supply 32B is arranged separately from the detection device 20. This increases the degree of freedom for arranging the detection device 20 and the second power supply 32B. The second power supply 32B is, for example, a rechargeable battery. The second power supply 32B is attached to the frame A5 (refer to FIG. 1). The second power supply 32B is configured to supply electric power to components of the human-powered vehicle A. This increases the convenience. The components of the human-powered vehicle A are, for example, the assist device C and other electric devices installed on the human-powered vehicle A. The first power supply 32A or the second power supply 32B can be configured to supply electric power to the detection device 20 and other components of the human-powered vehicle A. The second power supply 32B can be omitted.

The controller 30 includes at least one processor that includes, for example, a central processing unit (CPU) and a micro processing unit (MPU) and a memory (computer storage device). The electronic controller 30 is formed of one or more semiconductor chips that are mounted on a printed circuit board. The processor(s) and the memory can be provided on the same printed circuit board, or the memory can be a separate part from the processor(s). The memory includes, for example, a random access memory (RAM) and a read only memory (ROM). The memory can include a semiconductor memory and/or a hard disk drive. The memory is any computer storage device or any computer readable medium with the sole exception of a transitory, propagating signal. Any installation position of the controller 30 can be selected. In one example, the controller 30 is arranged in the housing 20A of the detection device 20. The controller 30 can be arranged outside the detection device 20. The controller 30 controls the detection device 20 in at least one of a first mode and a second mode, which consumes less power than the first mode, based on information related to the human-powered vehicle A. Since the detection device 20 is controlled based on information related to the human-powered vehicle A, the control is executed by the controller 30 in accordance with an intention of the driver of the human-powered vehicle A. The control method of the detection device 20 performed by the controller 30 is a method for controlling the detection device 20 provided at the human-powered vehicle A to detect an electromagnetic wave having a frequency that is greater than or equal to 30 GHz and excluding visible light. In this control method, the detection device 20 is controlled by the controller 30 in at least one of the first mode and the second mode, which consumes less power than the first mode. The controller 30 controls the detection device 20 in one of the first mode, the second mode, and a third mode, which consumes less power than the first mode and the second mode. Thus, the detection device 20 can be variously controlled. In the first mode, the controller 30 controls the detection device 20 so that the detection device 20 operates in accordance with an operation of the rider. In the second mode, the controller 30 controls the detection device 20 so that the detection device 20 intermittently operates. Thus, power consumption of the detection device 20 is further reduced in the second mode. In the third mode, the controller 30 stops the supply of electric power to the detection device 20. Thus, power consumption of the detection device 20 is further reduced in the third mode. In the third mode, low power can be supplied to the detection device 20 so that in a case where the control mode is switched to the first mode or the second mode, the detection device 20 is quickly driven in accordance with an operation of the switch N performed by the rider. In the controller 30, the memory stores a program for executing multiple control modes including the first mode, the second mode, and the third mode. The processor(s) of the controller 30 deploys and executes the program in the memory to implement the multiple control modes including the first mode, the second mode, and the third mode.

The controller 30 is configured to switch the multiple control modes based on information related to the human-powered vehicle A. If information related to the human-powered vehicle A is not obtained for a first predetermined time in the first mode, then the controller 30 controls the detection device 20 in the second mode. Thus, the switching from the first mode to the second mode is easily performed. The first predetermined time includes a predetermined time TA, a predetermined time TB, a predetermined time TC, and a predetermined time TD. If information related to the human-powered vehicle A is not obtained for a second predetermined time in the second mode, the controller 30 controls the detection device 20 in the third mode. Thus, the switching from the second mode to the third mode is easily performed. The second predetermined time includes a predetermined time TE, a predetermined time TF, a predetermined time TG and a predetermined time TH.

The information related to the human-powered vehicle A (hereinafter referred to as "the set information") includes at least one of information related to vibration of the human-powered vehicle A, information related to the total weight of the human-powered vehicle A, information related to the rotary body F of the human-powered vehicle A, information related to the operating device H of the human-powered vehicle A, and information related to the lock device M of the human-powered vehicle A. Thus, the detection device 20 can be controlled based on various kinds of information. The set information includes first information to seventh information. The first information includes the information related to vibration of the human-powered vehicle A. If a still state of the human-powered vehicle A exceeds the predetermined time TA in the first mode, then the controller 30 switches the first mode to the second mode. If the still state of the human-powered vehicle A exceeds the predetermined time TE in the second mode, then the controller 30 switches the second mode to the third mode. The still state of the human-powered vehicle A is a state in which no vibration of the human-powered vehicle A is detected by the vibration sensor I. Each of the predetermined time TA and the predetermined time TE is time for which no vibration of the human-powered vehicle A is detected and thus determines that the human-powered vehicle A is in the still state. The controller 30 switches the first mode to the second mode by recognizing the still state of the human-powered vehicle A based on vibration of the human-powered vehicle A. The controller 30 switches the second mode to the third mode by recognizing the still state of the human-powered vehicle A based on vibration of the human-powered vehicle A. Thus, power consumption of the detection device 20 is reduced in the human-powered vehicle A that is in the still state. If the human-powered vehicle A vibrates in the second mode or the third mode, then the controller 30 switches the second mode or the third mode to the first mode. Thus, the control mode of the controller 30 is easily switched from the second mode or the third mode to the first mode in accordance with a shift from the still state to the drive state.

The second information includes information related to rotation of the rotary body F. If a non-rotation state of the rotary body F exceeds the predetermined time TB in the first mode, then the controller 30 switches the first mode to the second mode. If the non-rotation state of the rotary body F exceeds the predetermined time TF in the second mode, then the controller 30 switches the second mode to the third mode. The still state of the human-powered vehicle A is a state in which the rotational speed of the rotary body F detected by the wheel rotation sensor J is zero. Each of the predetermined time TB and the predetermined time TF is time for which the rotational speed of the rotary body F is zero and thus determines that the human-powered vehicle A is still. The controller 30 switches the first mode to the second mode by recognizing the still state of the human-powered vehicle A based on rotation of the rotary body F. The controller 30 switches the second mode to the third mode by recognizing the still state of the human-powered vehicle A based on rotation of the rotary body F. Thus, power consumption of the detection device 20 is reduced in the human-powered vehicle A that is in the still state. If the rotary body F rotates in the second mode or the third mode, the controller 30 switches the second mode or the third mode to the first mode. Thus, the control mode of the controller 30 is easily switched from the second mode or the third mode to the first mode in accordance with a shift from the still state to the drive mode.

The third information includes information related to rotation of the crankshaft E1, into which human driving force is input. If a stop state of the crankshaft E1 exceeds the predetermined time TC in the first mode, then the controller 30 switches the first mode to the second mode. If the stop state of the crankshaft E1 exceeds the predetermined time TG in the second mode, then the controller 30 switches the second mode to the third mode. The still state of the human-powered vehicle A is a state in which the rotational speed of the crankshaft E1 detected by the crank rotation sensor K is zero. Each of the predetermined time TC and the predetermined time TG is time for which the rotational speed of the crankshaft E1 is zero and thus can determine that no user is riding the human-powered vehicle A. The controller 30 switches the first mode to the second mode by recognizing the still state of the human-powered vehicle A based on rotation of the crankshaft E1. The controller 30 switches the second mode to the third mode by recognizing the still state of the human-powered vehicle A based on rotation of the crankshaft E1. Thus, power consumption of the detection device 20 is reduced in the human-powered vehicle A that is in the still state. If the crankshaft E1 rotates in the second mode or the third mode, then the controller 30 switches the second mode or the third mode to the first mode. Thus, the control mode of the controller 30 is easily switched from the second mode or the third mode to the first mode in accordance with a shift from the still state to the drive mode.

The fourth information includes information related to a total weight WA of the human-powered vehicle A. Thus, whether or not there is a rider is easily determined based on information related to the total weight WA of the human-powered vehicle A. If the total weight WA is decreased in the first mode, the controller 30 switches the first mode to the third mode. Power consumption of the detection device 20 is reduced in the human-powered vehicle A that is in a non-riding state. If the total weight WA is increased in the third mode, then the controller 30 switches the third mode to the first mode. Thus, the control mode of the controller 30 is easily switched from the third mode to the first mode in accordance with a shift from the non-riding state to the riding state.

The fifth information includes information related to the operation state of the operating device H, which is manually operated to drive the brake device D. Thus, the multiple control modes are appropriately switched by recognizing whether or not there is a rider based on the operating mode of the operating device H. If a non-operation state in which no operation is performed on the operating device H exceeds the predetermined time TD in the first mode, then the controller 30 switches the first mode to the second mode. If the non-operation state, in which no operation is performed on the operating device H, exceeds the predetermined time TH in the second mode, then the controller 30 switches the second mode to the third mode. The non-operation state is a state in which the operating device H transmits no signal to the controller 30. Each of the predetermined time TD and the predetermined time TH is time for which the operating device H outputs no signal and thus can determine that the human-powered vehicle A is still. Thus, power consumption of the detection device 20 is reduced in the human-powered vehicle A that is in the non-riding state. If the operating device H is operated in the second mode or the third mode, then the controller 30 switches the second mode or the third mode to the first mode. Thus, the control mode of the controller 30 is easily switched from the second mode or the third mode to the first mode in accordance with a shift from the non-riding state to the riding state.

The sixth information includes information related to the lock device M of the human-powered vehicle A. Thus, the multiple control modes can be switched by recognizing the still state of the human-powered vehicle A based on a lock state of the human-powered vehicle A. If the lock device M is locked in the first mode, then the controller 30 switches the first mode to the third mode. Thus, power consumption of the detection device 20 is reduced in the human-powered vehicle A that is in the still state. If the lock device M is unlocked in the third mode, then the controller 30 switches the third mode to the first mode. Thus, the control mode of the controller 30 is easily switched from the third mode to the first mode in accordance with a shift from the still state to the drive state.

The seventh information includes information related to activation and deactivation of the switch N connected to the human-powered vehicle system 10. Thus, the multiple control modes can be switched based on an input by the rider. If the switch N is turned off in the first mode, then the controller 30 switches the first mode to the third mode. Thus, power consumption of the detection device 20 is reduced with the switch N turned off. If the switch N is turned on in the third mode, the controller 30 switches the third mode to the first mode. Thus, the control mode of the controller 30 is easily switched from the third mode to the first mode.

The controller 30 executes a first control, a second control, and a third control based on the set information. The first control is repeatedly executed in a case where the control mode of the controller 30 is the first mode. The second control is repeatedly executed in a case where the control mode of the controller 30 is the second mode. The third control is repeatedly executed in a case where the control mode of the controller 30 is the third mode. The switching between modes based on one of the first information to the seventh information included in the set information can be omitted from the first control, the second control, and the third control.

Figure 3:
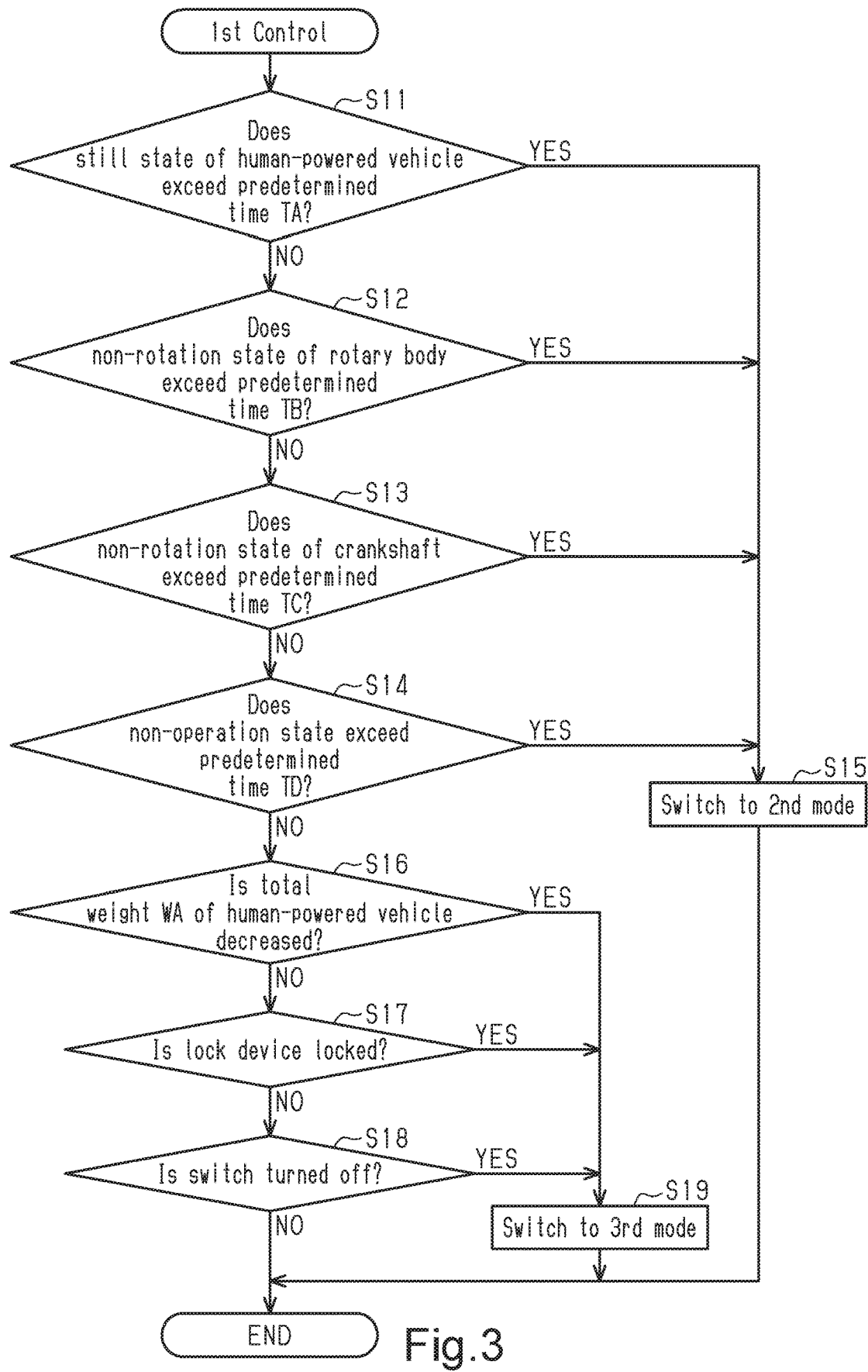
FIG. 3 is a flowchart showing one example of a control process executed in accordance with a first control.

One example of the first control will now be described with reference to FIG. 3.

In step S11, the controller 30 determines whether or not the still state of the human-powered vehicle A exceeds the predetermined time TA based on an output of the vibration sensor I. If the determination result of step S11 is negative, then the controller 30 proceeds to step S12 and determines whether or not the non-rotation state of the rotary body F exceeds the predetermined time TB based on an output of the wheel rotation sensor J. If the determination result of step S12 is negative, then the controller 30 proceeds to step S13 and determines whether or not the non-rotation state of the crankshaft E1 exceeds the predetermined time TC based on an output of the crank rotation sensor K. If the determination result of step S13 is negative, the controller 30 proceeds to step S14 and determines whether or not the non-operation state exceeds the predetermined time TD based on an output of the operating device H. If the determination result of step S14 is negative, then the controller 30 executes step S16. If the determination result of any one of steps S11 to S14 is affirmative, then the controller 30 proceeds to step S15 and switches the control mode to the second mode.

In step S16, the controller 30 determines whether or not the total weight WA of the human-powered vehicle A is decreased. If the determination result of step S16 is negative, then the controller 30 proceeds to step S17 and determines whether or not the lock device M is locked based on an output of the lock device M. If the determination result of step S17 is negative, then the controller 30 proceeds to step S18 and determines whether or not the switch N is turned off based on an output of the switch N. If the determination result of step S18 is negative, then the controller 30 maintains the first mode. If the determination result of any one of steps S16 to S18 is affirmative, then the controller 30 proceeds to step S19 and switches the control mode to the third mode.

One example of the second control will now be described with reference to FIGS. 4 and 5.

Figure 4:
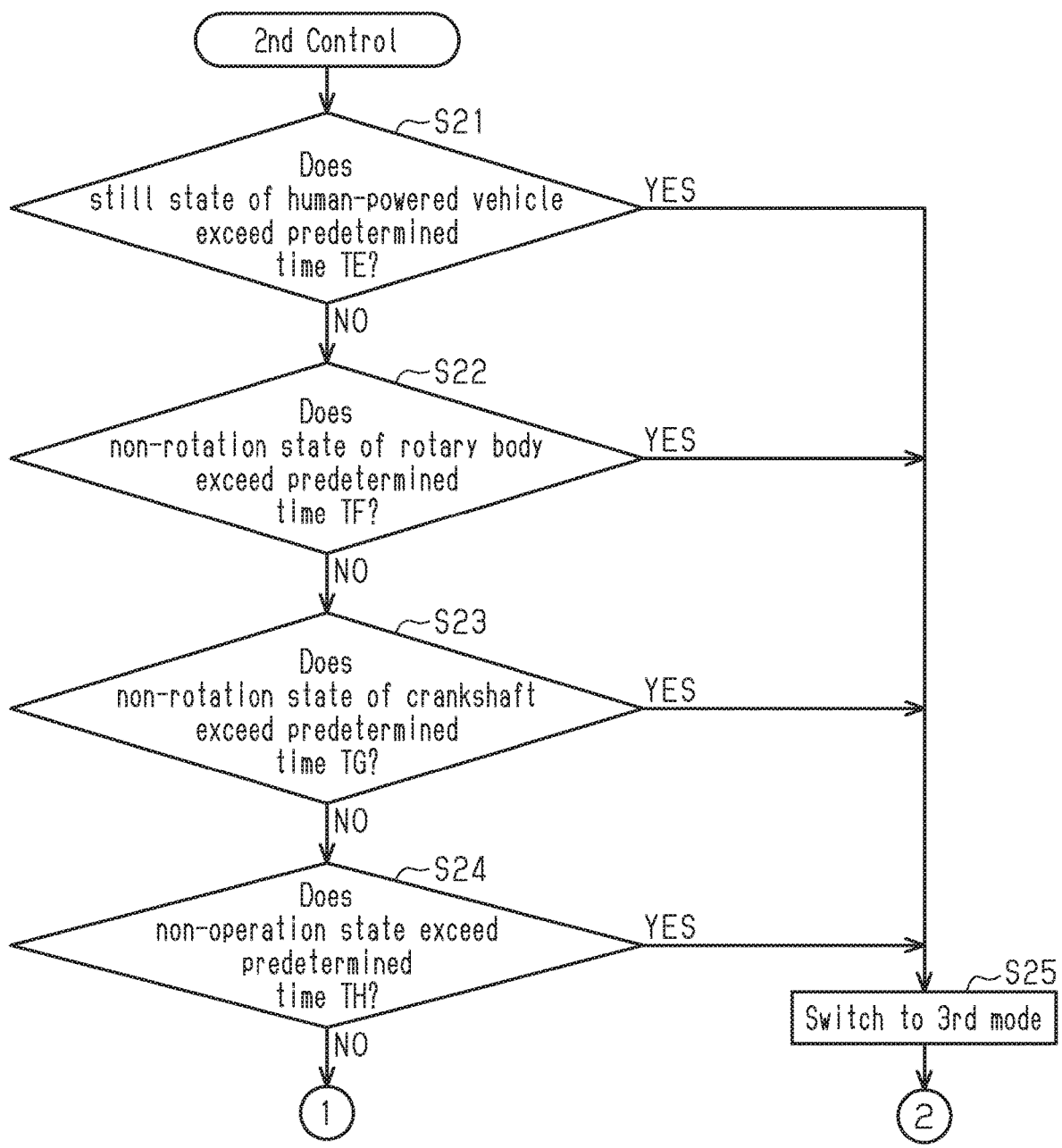
FIG. 4 is a flowchart showing one example of a control process executed in accordance with a second control.

As shown in FIG. 4, in step S21, the controller 30 determines whether or not the still state of the human-powered vehicle A exceeds the predetermined time TE based on an output of the vibration sensor I. If the determination result of step S21 is negative, then the controller 30 proceeds to step S22 and determines whether or not the non-rotation state of the rotary body F exceeds the predetermined time TF based on an output of the wheel rotation sensor J. If the determination result of step S22 is negative, then the controller 30 proceeds to step S23 and determines whether or not the non-rotation state of the crankshaft E1 exceeds the predetermined time TG based on an output of the crank rotation sensor K. If the determination result of step S23 is negative, then the controller 30 proceeds to step S24 and determines whether or not the non-operation state exceeds the predetermined time TH based on an output of the operating device H. If the determination result of step S24 is negative, then the controller 30 executes step S26. If the determination result of any one of steps S21 to S24 is affirmative, then the controller 30 proceeds to step S25 and switches the control mode to the third mode.

Figure 5:
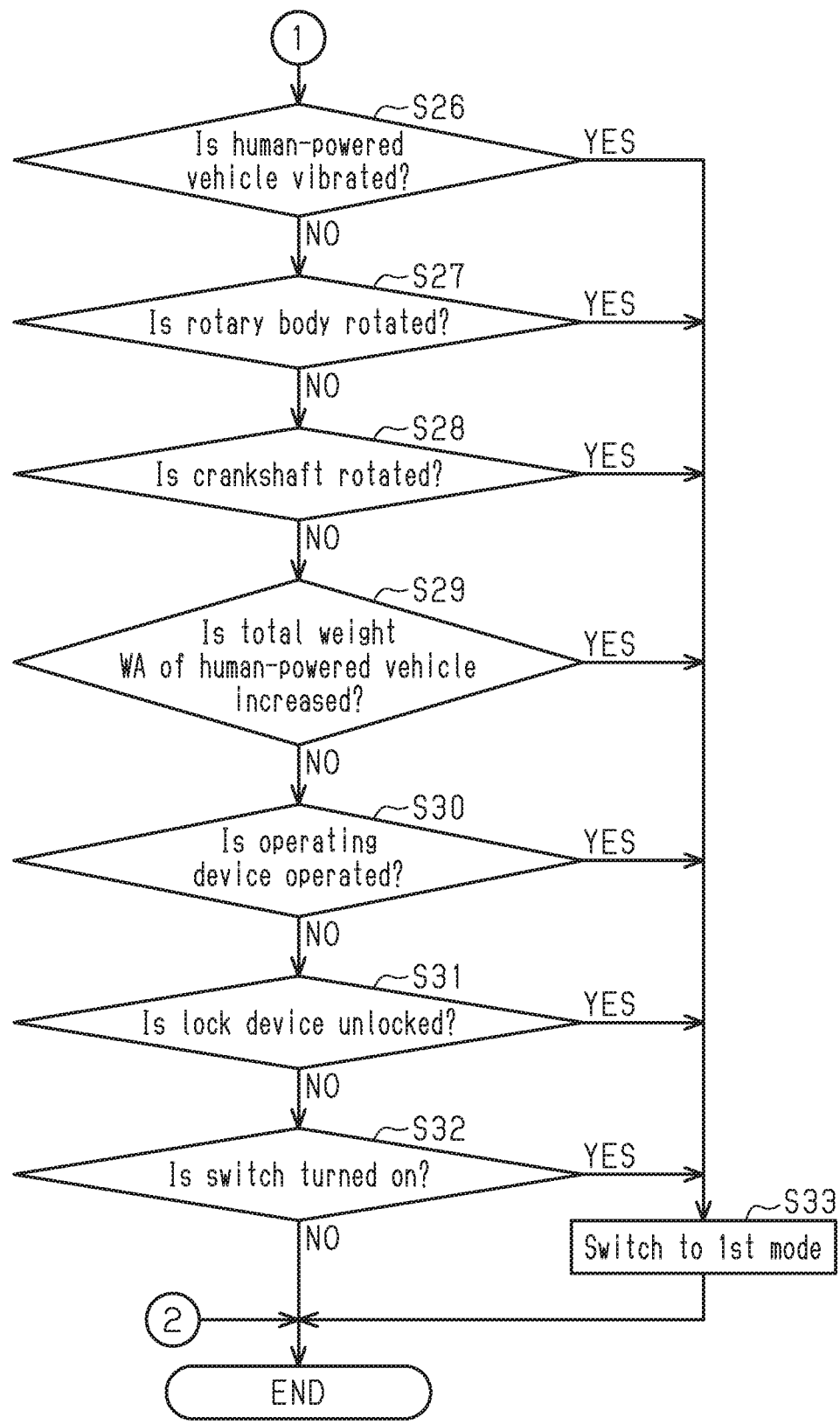
FIG. 5 is a flowchart showing one example of a control process executed in the second control.

As shown in FIG. 5, in step S26, the controller 30 determines whether or not the human-powered vehicle A is vibrated based on an output of the vibration sensor I. If the determination result of step S26 is negative, then the controller 30 proceeds to step S27 and determines whether or not the rotary body F is rotated based on an output of the wheel rotation sensor J. If the determination result of step S27 is negative, then the controller 30 proceeds to step S28 and determines whether or not the crankshaft E1 is rotated based on an output of the crank rotation sensor K. If the determination result of step S28 is negative, then the controller 30 proceeds to step S29 and determines whether or not the total weight WA of the human-powered vehicle A is increased based on an output of the load sensor L. If the determination result of step S29 is negative, then the controller 30 proceeds to step S30 and determines whether or not the operating device H is operated based on an output of the operating device H. If the determination result of step S30 is negative, then the controller 30 proceeds to step S31 and determines whether or not the lock device M is unlocked based on an output of the lock device M. If the determination result of step S31 is negative, then the controller 30 proceeds to step S32 and determines whether or not the switch N is turned on based on an output of the switch N. If the determination result of step S32 is negative, then the controller 30 maintains the second mode. If the determination result of any one of steps S26 to S32 is affirmative, then the controller 30 proceeds to step S33 and switches the control mode to the first mode.

One example of the third control will now be described with reference to FIG. 6.

Figure 6:
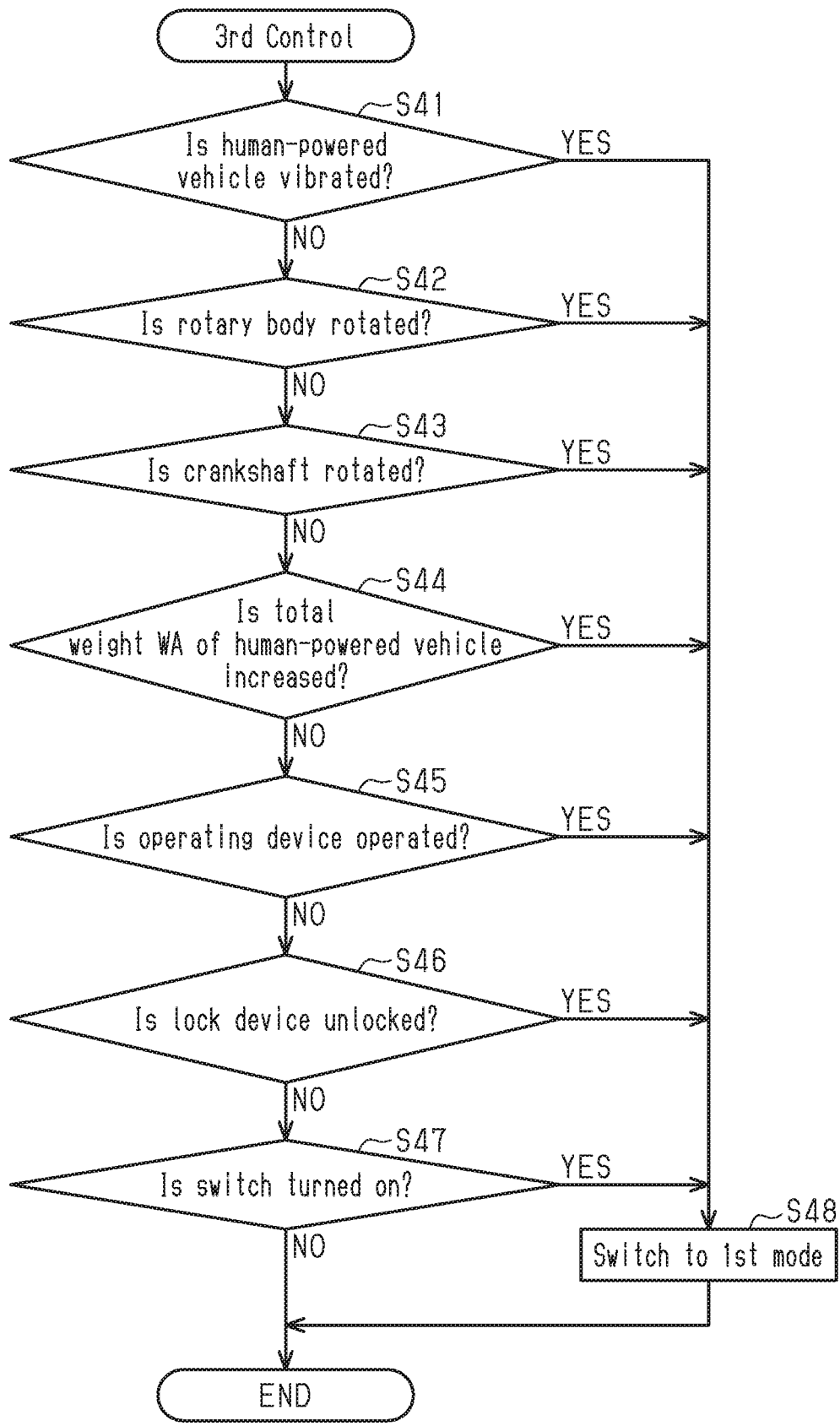
FIG. 6 is a flowchart showing one example of a control process executed in accordance with a third control.

As shown in FIG. 6, in step S41, the controller 30 determines whether or not the human-powered vehicle A is vibrated based on an output of the vibration sensor I. If the determination result of step S41 is negative, then the controller 30 proceeds to step S42 and determines whether or not the rotary body F is rotated based on an output of the wheel rotation sensor J. If the determination result of step S42 is negative, then the controller 30 proceeds to step S43 and determines whether or not the crankshaft E1 is rotated based on an output of the crank rotation sensor K. If the determination result of step S43 is negative, then the controller 30 proceeds to step S44 and determines whether or not the total weight WA of the human-powered vehicle A is increased based on an output of the load sensor L. If the determination result of step S44 is negative, then the controller 30 proceeds to step S45 and determines whether or not the operating device H is operated based on an output of the operating device H. If the determination result of step S45 is negative, then the controller 30 proceeds to step S46 and determines whether or not the lock device M is unlocked based on an output of the lock device M. If the determination result of step S46 is negative, then the controller 30 proceeds to step S47 and determines whether or not the switch N is turned on based on an output of the switch N. If the determination result of step S47 is negative, then the controller 30 maintains the third mode. If the determination result of any one of steps S41 to S47 is affirmative, then the controller 30 proceeds to step S48 and switches the control mode to the first mode.

The human-powered vehicle system 10 has the operation and effect as follows. The first mode and the second mode are switched as necessary. Thus, power consumption of the detection device 20 is reduced.

Modifications

The above embodiment illustrates applicable forms of a controller, a human-powered vehicle system, and a control method according to the present embodiment and is not intended to be restrictive. The controller, the human-powered vehicle system, and the control method according to the present embodiment can have modes different from the modes described in the embodiment. In examples of such modes, the configuration of the embodiment is partially replaced, modified, or omitted or a further configuration is added to the embodiment. Examples of modifications of the embodiment will be described below.

The process of the first control executed by the controller 30 can be changed in any manner. In a first example, the controller 30 switches the control mode to the third mode in step S15. In a second example, at least one of steps S11 to S14 can be omitted from the first control executed by the controller 30. In a third example, the controller 30 switches the control mode to the second mode in step S19. In a fourth example, at least one of steps S16 to S18 is omitted from the first control executed by the controller 30.

The process of the second control executed by the controller 30 can be changed in any manner. In a first example, at least one of steps S21 to S24 can be omitted from the second control executed by the controller 30. In a second example, at least one of steps S26 to S32 can be omitted from the second control executed by the controller 30.

The process of the third control executed by the controller 30 can be changed in any manner. In a first example, the controller 30 switches the control mode to the second mode in step S48. In a second example, any one of steps S41 to S47 can be omitted from the third control executed by the controller 30.

The number of control modes of the controller 30 can be changed to any number. In a modification of the controller 30, the third mode can be omitted from the control modes. The controller 30 of this modification stops the supply of electric power to the detection device 20 in the second mode. Steps S16 to S19 are omitted from the first control executed by the controller 30 of this modification. Steps S21 to S25 are omitted from the second control executed by the controller 30 of this modification. Since the third mode is omitted, the controller 30 of this modification does not execute the third control.

In the above embodiment, the human-powered vehicle system according to the present disclosure is applied to a bicycle. However, the human-powered vehicle according to the present disclosure can be applied to any human-powered vehicle in addition to a bicycle.

What is claimed is:

1. An electronic controller for a detection device that is mounted to a human-powered vehicle to detect an electromagnetic wave having a frequency that is greater than or equal to 30 GHz and excluding visible light, the electronic controller comprising:
   at least one processor configured to control the detection device in at least one of a first mode and a second mode that consumes less power than the first mode, the processor controlling the detection device based on information related to the human-powered vehicle that includes at least one of information related to vibration of the human-powered vehicle, information related to a total weight of the human-powered vehicle, information related to a rotary body of the human-powered vehicle and information related to an operating device for operating at least a braking device of the human-powered vehicle.

2. The electronic controller according to claim 1, wherein the information related to the human-powered vehicle further includes information related to a lock device of the human-powered vehicle.

3. The electronic controller according to claim 1, wherein upon the at least one processor determining the information related to the human-powered vehicle is not obtained for a first predetermined time in the first mode, the at least one processor is configured to control the detection device in the second mode.

4. The electronic controller according to claim 1, wherein the at least one processor is configured to control the detection device so that the detection device intermittently operates in the second mode.

5. The electronic controller according to claim 1, wherein the at least one processor is configured to stop supply of electric power to the detection device in the second mode.

6. The electronic controller according to claim 1, wherein the at least one processor is configured to control the detection device in any one of the first mode, the second mode, and a third mode that consumes less power than the first mode and the second mode.

7. The electronic controller according to claim 6, wherein the at least one processor is configured to stop supply of electric power to the detection device in the third mode.

8. The electronic controller according to claim 1, wherein the detection device outputs the electromagnetic wave having the frequency that is greater than or equal to 30 GHz and excluding visible light, and the detection device detects the electromagnetic wave that is reflected.

9. The electronic controller according to claim 1, wherein the detection device detects at least one of an ultraviolet ray, an infrared ray, a submillimeter wave, and a millimeter wave.

10. The electronic controller according to claim 1, wherein the detection device outputs an electromagnetic wave including at least one of an ultraviolet ray, an infrared ray, a submillimeter wave, and a millimeter wave, and the detection device detects the electromagnetic wave that is reflected.

11. A human-powered vehicle system comprising the electronic controller according to claim 1, and further comprising:
a detection device that detects an electromagnetic wave having a frequency that is greater than or equal to 30 GHz and excluding visible light.

12. The human-powered vehicle system according to claim 11, further comprising
a power supply that supplies electric power to the detection device.

13. The human-powered vehicle system according to claim 12, wherein
the power supply includes at least one of a power generator and a power storage portion.

14. The human-powered vehicle system according to claim 12, wherein
the detection device includes a housing, and
the power supply is arranged in the housing.

15. The human-powered vehicle system according to claim 12, wherein
the power supply is arranged separately from the detection device.

16. The human-powered vehicle system according to claim 12, wherein
the power supply is configured to supply electric power to a component of the human-powered vehicle.

17. A electronic controller for a detection device provided at a human-powered vehicle to detect an electromagnetic wave having a frequency that is greater than or equal to 30 GHz and excluding visible light, the electronic controller comprising:
at least one processor configured to control the detection device in at least one of a first mode and a second mode that consumes less power than the first mode, the at least one processor being configured to control the detection device in any one of the first mode, the second mode, and a third mode that consumes less power than the first mode and the second mode, upon the at least one processor determining the information related to the human-powered vehicle is not obtained for a second predetermined time in the second mode, the at least one processor being configured to control the detection device in the third mode.

18. A control method comprising:
controlling a detection device that is mounted to a human-powered vehicle to detect an electromagnetic wave and having a frequency that is greater than or equal to 30 GHz and excluding visible light in at least one of a first mode and a second mode that consumes less power than the first mode, the controlling of the detection device being based on information related to the human-powered vehicle that includes at least one of information related to vibration of the human-powered vehicle, information related to a total weight of the human-powered vehicle, information related to a rotary body of the human-powered vehicle and information related to an operating device for operating at least a braking device of the human-powered vehicle.

* * * * *